(No Model.)
G. W. SCOTT.
HARVESTER.
No. 502,534. Patented Aug. 1, 1893.
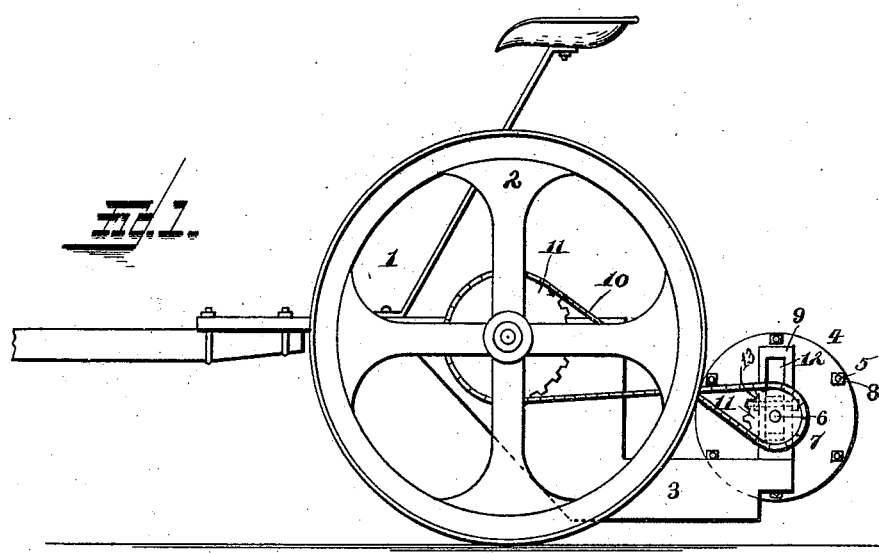
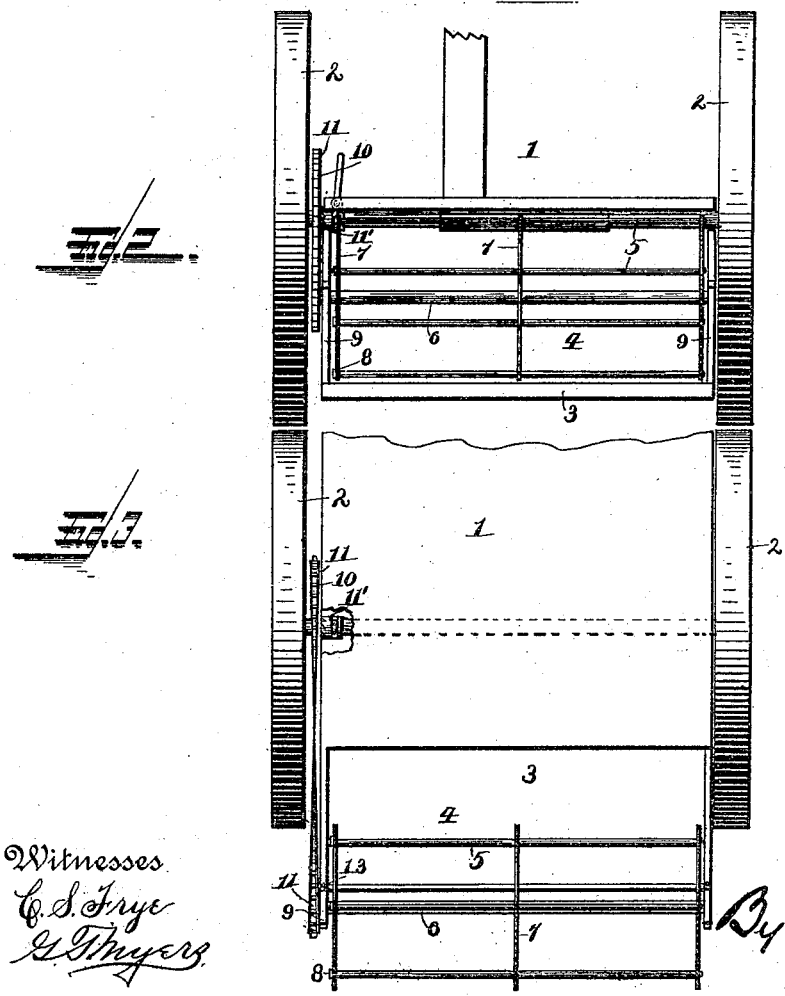
Witnesses
C. S. Frye
G. T. Myers
G. W. Scott
Inventor
By Hopkins & Atkins
Attorneys

UNITED STATES PATENT OFFICE.

GEORGE W. SCOTT, OF BELTON, MISSOURI.

HARVESTER.

SPECIFICATION forming part of Letters Patent No. 502,534, dated August 1, 1893.

Application filed July 14, 1892. Serial No. 440,041. (No model.)

*To all whom it may concern:*

Be it known that I, GEORGE W. SCOTT, of Belton, county of Cass, and State of Missouri, have invented certain new and useful Improvements in Harvesters, of which the following is a specification, reference being had to the accompanying drawings.

The object of my invention is to produce a simple and efficient device for harvesting small grains, and consists in the arrangement and construction of parts hereinafter illustrated and described.

In the accompanying drawings, Figure 1 is a side elevation of my harvester. Fig. 2 is a rear view of the same; and Fig. 3 is a top plan view of the same.

Referring to the figures on the drawings, 1 indicates a suitable frame structure, which is preferably of the kind illustrated in the drawings, in which 2 indicates a pair of wheels carrying a box or hopper 3.

4 indicates a reel located preferably in the rear of the box, and provided with a number of cylindrical rods 5 arranged in its periphery, and adapted by their rotation to knock the tops of the growing grass against the sides of the box, and, separating the seed from the stalks, to deposit them in the box. This reel may be made in any suitable manner, preferably by a cylindrical axle 6 provided with wheels or disks 7 thereon and cylindrical carrying rods in any suitable manner. The rods are preferably of steel or iron of suitable weight and diameter, and may be solid or tubular and screwed into the end wheels or disks, or passed through them and bolted with nuts 8, as may be preferred.

The reel is carried on suitable bearings 9 upon the box, and is geared to one of the wheels of the frame structure, preferably by a sprocket band 10 operated with suitable sprocket-wheels 11 fastened respectively to one of the wheels and the axle of the reel respectively; but any suitable connecting driving mechanism may be employed instead. The sprocket-wheel that is connected with the wheels 2 may be provided with a clutch 11' for throwing it into and out of gear, if preferred, or any other suitable means may be employed for that purpose. The journals 9 which support the wheel are preferably adjustable by means of slots 12, and nuts 13, so that the height of the reel may be accommodated to different stands of grass, the reel preferably striking just beneath the heads so as to completely clean the stalks of seed.

An important factor of my invention is the peculiar construction of the reel and frame, which present no sharp corners liable to sever the heads, but are adapted to press the heads of clover between the cylindrical rods of the reel and the blunt edge of the frame, whereby the seeds are pressed from the clover heads into the vehicle and the severing of the heads prevented.

What I claim is—

In a harvester, the combination with a frame structure and suitable driving mechanism, of a vertically adjustable transverse reel composed of circular disks mounted upon a cylindrical shaft, and circular rods secured at the peripheries of said disks and adapted to press the heads of clover between said cylindrical rods and the edge of the frame, whereby the seeds are pressed from the clover heads into the vehicle, and in consequence of the cylindrical form of the reel rods and the blunt edge of the frame between which the heads are pressed, the severing of the heads is prevented, substantially as specified.

In testimony of all which I have hereunto subscribed my name.

GEORGE W. SCOTT.

Witnesses:
D. M. COLBERN,
W. M. MARCH.